W. L. HOLMS, L. M. GREEN & J. S. PATTINSON.
MEANS FOR SEPARATING WATER OR SOLUTION FROM SOLIDS, SUCH AS SLIMY ORES, PULP, AND THE LIKE.
APPLICATION FILED MAR. 5, 1909.
957,775.
Patented May 10, 1910.
2 SHEETS—SHEET 1.
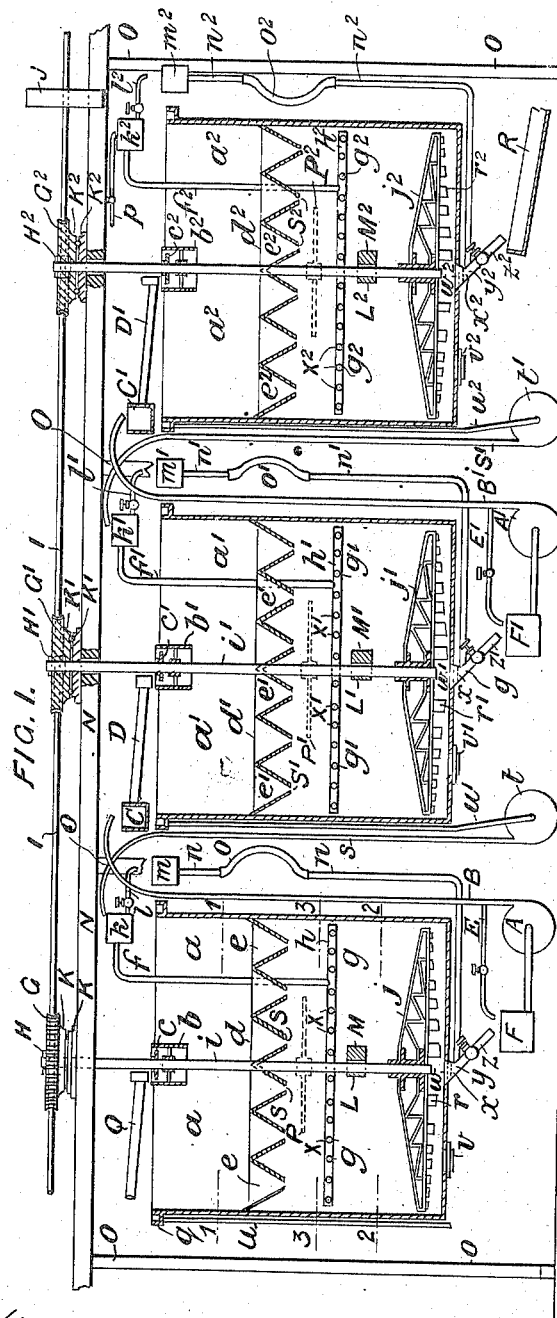
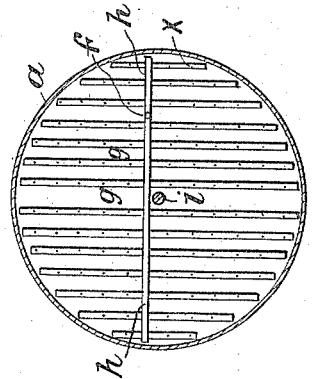
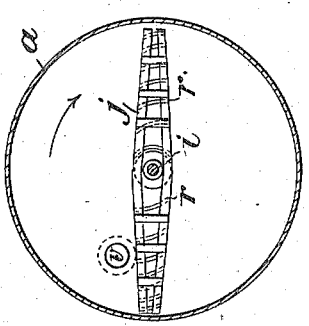
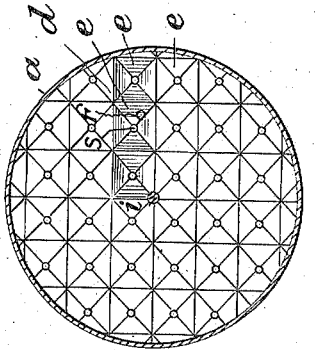

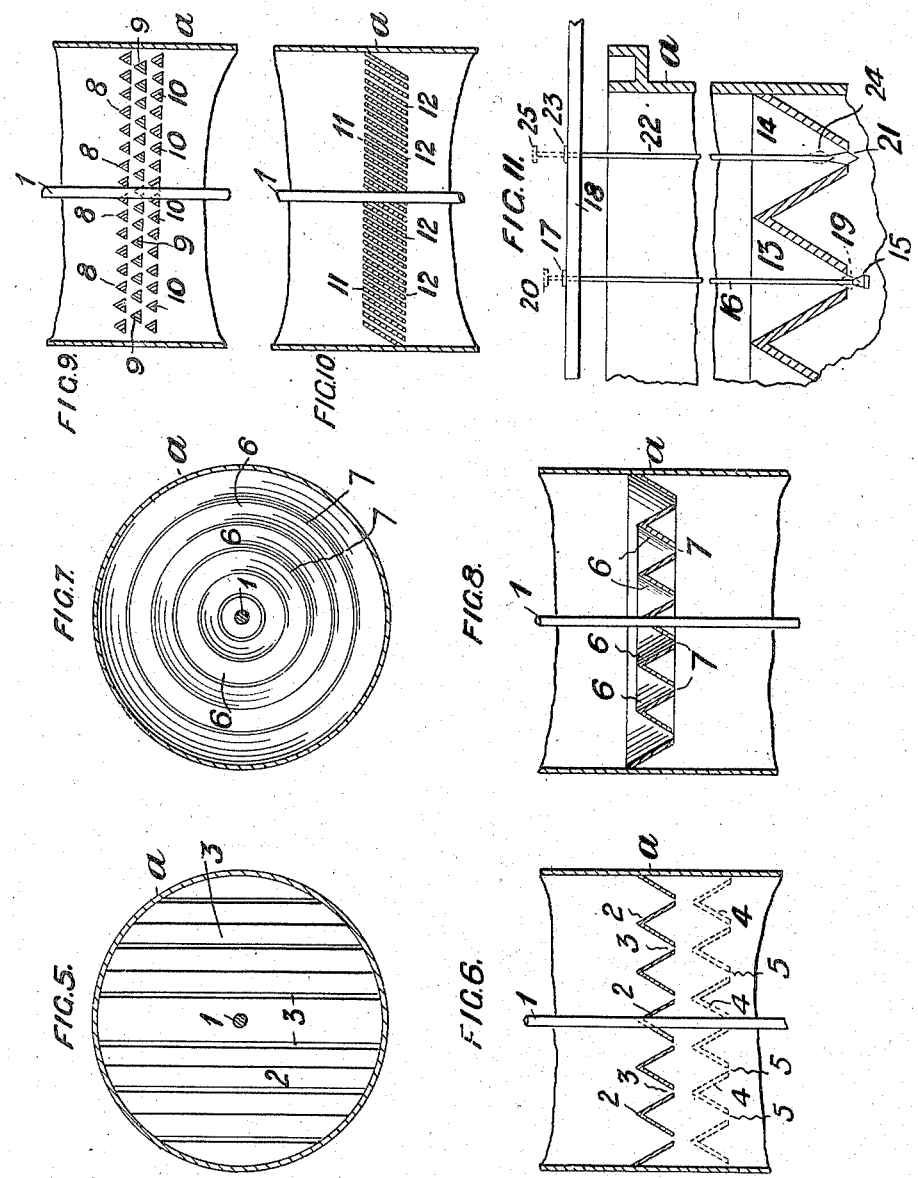

UNITED STATES PATENT OFFICE.

WILLIAM LEONARD HOLMS, OF GUADALAJARA, MEXICO, LEONARD MELVILL GREEN, OF LONDON, ENGLAND, AND JOHN SHIELD PATTINSON, OF ZACATECAS, MEXICO.

MEANS FOR SEPARATING WATER OR SOLUTION FROM SOLIDS, SUCH AS SLIMY ORES, PULP, AND THE LIKE.

957,775.      Specification of Letters Patent.      Patented May 10, 1910.

Application filed March 5, 1909. Serial No. 481,521.

*To all whom it may concern:*

Be it known that we, WILLIAM LEONARD HOLMS, LEONARD MELVILL GREEN, and JOHN SHIELD PATTINSON, subjects of the King of Great Britain and Ireland, residing, respectively, at Guadalajara, Mexico; 70 Basinghall street, London, England, and Zacatecas, Mexico, have invented new and useful Improvements in Means for Separating Water or Solution from Solids, such as Slimy Ores, Pulp, and the Like, of which the following is a specification.

This invention relates to an improved apparatus for separating liquids, such as water or solution, from solid particles suspended in the said water or solution.

The objects are to extract and recover dissolved values contained in a mixture which we call pulp, to remove soluble values adhering to insoluble particles, to remove water from pulp containing same, and substitute therefor solution, and to discharge solid residues from the apparatus.

Another object is to provide an apparatus by which the process may be efficiently and economically carried out.

It has heretofore been common to separate the liquid from the solid particles held in suspension therein by allowing the pulp to remain in a quiescent state in a suitable vessel, for a considerable period, during which the solid particles settle to the bottom of said vessel, leaving a certain proportion of the said liquid in a clear or semi-clear state, permitting of its being drawn off or decanted from the settled mass underlying same. The residual mass of solid particles and solution is then mixed with a further quantity of water or comparatively worthless solution, and thereafter is allowed to settle as before, after which the clear solution is again drawn off. By repeating this series of operations a number of times, a large proportion of the values contained in the original solution can be removed from the solid particles suspended therein, but the process is objectionable inasmuch as, (1) the volume of liquid in which these recovered values are contained is much greater than the volume of the original liquid, or in other words, the liquid is of a more dilute character than the original; (2) it is protracted and tedious in operation; (3) the apparatus required is both cumbersome and expensive; (4) being of an intermittent character, this process necessitates considerable attention and judgment in its operation. This method is generally known as the "decantation process." It has also been proposed, as an improvement on the foregoing process, to render the operation continuous by introducing the pulp constantly into a suitable vessel of such dimensions and form that a portion of the liquid constituent will constantly overflow at a suitable point at or near the top of the vessel, while the solid particles and the remaining portion of the liquid are continuously withdrawn as a more or less viscous or pasty mass at a suitable point at or near the bottom of the vessel. The pasty mass so withdrawn, is then diluted by a continuous stream of water or comparatively weak solution and allowed to enter a second vessel similar to the first, where, as before, the clear solution overflows at or near the top and the solid particles are withdrawn as a thick mud at the bottom of the vessel. Any number of vessels may be used, and the cycle of operations, above described, carried out as often as desired, until it is found that the thick mud discharged from the last vessel of the series contains a sufficiently small amount of soluble values. This method of separation may be called "the continuous decantation process." This process, although continuous, still retains the objectionable feature that the liquid constituent mixed with the solid particles discharged, is of precisely the same composition and quality as the clear liquid which overflows from the top of the same vessel.

Our invention relates to the separation of liquids from solids by a process of decantation, but in a more economical and thorough manner than heretofore, and by means of apparatus to be described.

In order that our invention may be clearly understood, both as to construction and operation, we shall refer to the accompanying drawings, in which:—

Figure 1 is an elevation of a system of three separating vessels and their accessory apparatus. Fig. 2 is a plan of one separating vessel in section on line 1—1, Fig. 1, showing the "barrier," to be afterward described herein. Fig. 3 is a plan of one separating vessel, in section on line 2—2, Fig. 1 showing the "collector," to be afterward described herein. Fig. 4 is a plan of one separating vessel, in section on line 3—3, Fig. 1 showing the distributing pipes, hereinafter described. Fig. 5 is a plan of an alternative form of barrier. Fig. 6 is an elevation of Fig. 5. Fig. 7 is a plan of another alternative form of barrier. Fig. 8 is an elevation of Fig. 7. Fig. 9 is an elevation of another alternative form of barrier. Fig. 10 is an elevation of yet another alternative form of barrier. Fig. 11 is an elevation of apparatus for regulating the size of the orifices S S, Fig. 1.

In Figs. 1 to 4, $a$, $a^1$, $a^2$ are tanks of cylindrical or other convenient form.

$b$, $b^1$, $b^2$ are circular baffle plates, forming an annular wall or partition, and having neither top nor bottom.

$c$, $c^1$, $c^2$ are disks of wood, metal or other suitable material, upon which the pulp entering the tank impinges, and which serve to convert the direction of the flow from a vertical to a horizontal direction, thus securing a quiet delivery of the pulp to the tank. These disks may be attached rigidly to the shafts, $i$, $i^1$, and $i^2$, as shown, and revolve with same, or be made stationary with an aperture in which the shaft may revolve freely.

$d$, $d^1$, $d^2$ are partitions extending completely across the tank, and $e$, $e^1$, $e^2$ are a number of small vessels made in the form of inverted pyramids, and having comparatively small orifices S S. These small vessels are joined rigidly together, and are placed in such a manner in the tank as to form a horizontal partition in the latter, thereby preventing all communication between the upper and the lower portions of the tank except through the orifices S S. The sides of these pyramidal vessels are inclined at such an angle that solid particles may slide easily on same down to the orifices S S. These boxes constitute what we call the barrier.

$f$, $f^1$, $f^2$ are pipes leading from the upper portion of the boxes $k$, $k^1$, $k^2$, to the pipes $h$, $h^1$, $h^2$. These pipes remove from their respective boxes all the liquid admitted to same in excess of what is removed through the pipes $l$, $l^1$, $l^2$. They may therefore be termed overflow pipes.

$g$, $g^1$, $g^2$ are a number of pipes connected to the pipes $h$, $h^1$, $h^2$, and may be furnished with numerous small perforations, as shown in Fig. 4 for distributing the liquid in the tank, which perforations may discharge the liquid in an upward direction, as shown, or in a downward, horizontal or intermediary direction, as preferred. Slots may be substituted for perforations, if preferred. Again, all or any of these pipes may be without perforations or slots, and with one or both ends open. Again, any or all of these pipes may be horizontal, as shown, or may be inclined at any desired angle. These pipes may also be arranged radially, if desired. These pipes may also be entirely omitted, if desired. The pipes $h$, $h^1$, $h^2$ connecting $f$ and $g$ may be horizontal, as shown, or may be inclined at any desired angle either in a vertical or a horizontal plane. Either one or both ends may be open, and the length of the pipes may be varied as desired. The boxes $k$, $k^1$, $k^2$ have upper and lower outlet, as shown. The pipes $l$, $l^1$, $l^2$ are each provided with a regulating valve and discharge into boxes $m$, $m^1$, $m^2$.

$n$, $n^1$, $n^2$ are pipes connecting the boxes $m$, $m^1$, $m^2$ with the chambers $y$, $y^1$, $y^2$, and $o$, $o^1$, $o^2$ are flexible hose pipes connecting the two parts of the pipes $n$, $n^1$, $n^2$, and are inserted so that the boxes $m$, $m^1$, $m^2$ may be raised or lowered, so as to alter the pressure at the discharge point of the pipes $n$, $n^1$, $n^2$ as required.

$p$ is a pipe connected to a supply of water or weak solution, furnished with a regulating valve and discharging into the box $k^2$.

$q$, $q^1$, $q^2$ are annular channels receiving the clear solution overflowing from $a$, $a^1$, $a^2$.

$i$, $i^1$, $i^2$ are vertical shafts, actuated by the worm wheels, G, $G^1$, $G^2$, or other suitable device, and carrying and rotating the collectors $j$, $j^1$, $j^2$, which consists essentially of a horizontal arm, fixed to and revolving with the shaft $i$, and having attached to it a number of blades or vanes $r$, $r^1$, $r^2$, each of which is set at such an angle to the longer axis of the arm that the thick pulp in the bottom of the vessel is continually pushed or scraped by the blades toward $w$, $w^1$, $w^2$, the discharge openings at the center of the tanks, and finally issues therefrom. The main arm of the collector may be of a trussed design, as shown, or of other suitable construction. The arrow in Fig. 3 indicates its direction of motion. The blades $r$, $r^1$, $r^2$ are preferably so arranged that each one takes an exactly proportionate part of the thick pulp toward the center, according to its position with respect to the radius of the tank.

$t$, $t^1$ are centrifugal pumps, as shown, but any other suitable type of pump may be used to raise the solution, through the discharge pipes $s$, $s^1$, to the boxes $k$, $k^1$. If desired, the pipes $s$, $s^1$ may, instead of discharging the solution into $k$, $k^1$, conduct it to precipitation boxes or other precipitating device, after having passed through which it can flow by gravity to $k$, $k^1$.

$s$, $s^1$ are the discharge pipes from the pumps $t$, $t^1$.

$u$, $u^1$, $u^2$ are discharge pipes removing the solution from the overflows $q$, $q^1$, $q^2$. The pipe $u$ takes the solution recovered from $a$ to any desired reservoir, where it may be disposed of as seen fit. The pipes $u^1$ and $u^2$ take the solution to the pumps, $t$, $t^1$ respectively.

$v$, $v^1$, $v^2$ are doors in the bottom of the tanks $a$, $a^1$, $a^2$ to permit of access to the interior for inspection or repairs.

$w$, $w^1$, $w^2$ are circular or other conveniently shaped orifices in the center of the bottoms of the tanks. Through these orifices the thick pulp brought to the center of the tank by the collectors $j$, $j^1$, $j^2$ passes into the chambers $y$, $y^1$, $y^2$.

$x$, $x^1$, $x^2$ are screens or sieves with coarse apertures, stretched across $y$, $y^1$, $y^2$. The object of these screens is to prevent the thick pulp from falling at any time in a solid lump to the bottom of $y$.

The chambers $y$, $y^1$, $y^2$ receive the thick pulp passing from $a$, $a^1$, $a^2$ through $w$, $w^1$, $w^2$, and also liquid from the pipes $n$, $n^1$, $n^2$. The discharge outlet of these chambers is through the pipes $z$, $z^1$, $z^2$. The bottom of these chambers is made preferably with a sharp slope toward the pipes $z$, $z^1$, $z^2$, in order to facilitate the flow of pulp to that point. The pipes $z$, $z^1$, $z^2$ are fitted with regulating valve and conduct the pulp from $y$, $y^1$ to the boxes $f$, $f^1$, and from $y^2$ to the waste channel or launder R.

A, $A^1$, are centrifugal pumps, which raise the pulp from the boxes F, $F^4$ to the boxes C, $C^1$. These pumps may be, as shown, of the centrifugal type, or they may be of the spiral diaphragm, plunger, or other suitable type. An air-lift pump may also be used for this purpose, or a bucket elevator.

B, $B^1$ are the discharge pipes from the pumps A, $A^1$, and C, $C^1$ are boxes receiving the pulp discharged through B, $B^1$, and delivering same through the pipes D, $D^1$. If desired these boxes may have an overflow pipe going back to the boxes F, $F^1$, in order to maintain a constant head in the box.

D, $D^1$ are pipes conveying the pulp from C, $C^1$ to $c^1$, $c^2$. These pipes may conveniently terminate in a tee shaped distributer loosely encircling the shaft.

E, $E^1$ are small pipes fitted with regulating valves, and inserted into the pipes B, $B^1$, so that the quantity of pulp discharged by the pumps A, $A^1$ may be regulated by returning a certain proportion to the boxes F, $F^1$.

G, $G^1$, $G^2$ are wormwheels keyed to and actuating the shafts $i$, $i^1$, $i^2$.

H, $H^1$, $H^2$ are worms intermeshing with and driving the worms G, $G^1$, $G^2$.

I is a horizontal shaft, keyed to and driving the worms H, $H^1$, $H^2$.

J is a pulley keyed to and driving the shaft I.

K, $K^1$, $K^2$ are ball-bearings from which the shafts $i$, $i^1$, $i^2$ are suspended. The upper or moving portion of the ball-bearings is fixed to the worm wheel, and to the vertical shaft, while the lower or stationary portion is fixed to the framework of the girder or narrow platform N.

L, $L^1$, $L^2$ are vertical guide bearings in which the shafts $i$, $i^1$, $i^2$ revolve. They are fixed to the beams M, $M^1$, $M^2$.

M, $M^1$, $M^2$ are horizontal beams traversing the tanks, and fixed at each end to same.

O, O, O, O are posts supporting the platform N.

P, $P^1$, $P^2$ (shown dotted) are stirrers fixed to and revolving with the shafts $i$, $i^1$, $i^2$, and which may be used if desired.

Q is a pipe conducting the original pulp from a suitable reservoir to the disk $c$ of tank $a$. This pipe may conveniently terminate in a tee shaped distributer.

R is a channel or conduit for receiving the final pulp discharged from $a^2$ and running it to waste.

S, $S^1$, $S^2$ are the orifices in the compartments $e$, $e^1$, $e^2$ of the barriers $d$, $d^1$, $d^2$. As shown these are circular, but they may, if preferred, be oval, triangular, rectangular, or any other shape.

X, $X^1$, $X^2$ are perforations in the pipes $g$, $g^1$, $g^2$.

In Figs. 5 and 6 $a$ is the tank. 1 is the shaft. 2, 2, 2, 2 are partitions inclined to one another, so as to form triangularly-shaped compartments, traversing the tank from side to side, and having slot-shaped openings 3 where two adjacent partitions approach each other at the bottom, these slots extend preferably from side to side of the tank. 4, 4, 4, 4 are the partitions of a second barrier placed beneath the first. 5, 5, 5 are the slot-shaped openings of this second barrier.

In Figs. 7 and 8 $a$ is the tank. 1 is the shaft. 6, 6, 6, 6 are partitions in the form of a number of truncated cones, which being set with their bases alternately above or below, form in conjunction with each other, a number of circular channels, which are approximately triangular in a cross section taken on any radius of the tank, and have circular slot-shaped openings 7 formed at the points where two adjacent partitions approach each other at the bottom.

In Fig. 9 $a$ is the tank. 1 is the shaft. 8, 8, 8, 8 are a number of pieces of wood, metal or other suitable material, which are triangular in cross section, as shown, and traverse the tank from side to side, horizontally, forming slot openings between adjacent pieces. 9, 9, 9, 9 are similar pieces placed immediately below the pieces 8, 8, 8, 8, and in such a manner that apices of the triangles of the lower row bisect the slot openings of the upper row. 10, 10, 10, 10 are similar pieces placed immediately below the row 9, 9, 9, 9 and occupy the same position relatively to the latter as those marked 9, 9, 9, 9 hold with respect to the row 8, 8, 8, 8. As shown, the apices of the triangles in any given row are on the same level as the bases of the triangles of the row preceding them, but, if desired, these apices may be so set as to project into the slot opening and thus be at a higher level than the bases of the triangles of the preceding row.

In Fig. 10 $a$ is the tank. 1 is the shaft. 11, 11, 11, 11 are parallel partitions of wood, metal, or other suitable material, set at such an angle that the solid particles descending from the upper portion of the tank may readily slide down into the lower portion of the tank. 12, 12, 12, 12 are the openings between the partitions, through which the solids descend. Both the partitions and the openings extend across the tank from side to side. If a second barrier of the same type be placed beneath the one shown, it is preferable to incline its partitions in a direction the reverse of that used in the upper one. In this type of barrier it will be noted that the area of opening is uniform throughout, and that its obstructing effect is, therefore, due only to changing the direction of the upward currents.

In Fig. 11 $a$ is the tank. 13 and 14 are pyramidal compartments of the main barrier, of the type shown in Fig. 1. 15 is a conically-shaped plug of wood, metal, rubber, or other suitable material, rigidly fixed at its center to the rod 16, which passing through the center of 15 at its lower extremity is capable of being raised by lifting the cross piece 17, or handle attached thereto. It passes through a hole in the support 18, and is fitted to same tight enough to retain its position at whatever point it may be set. 19 shows the position of the plug with handle 20, when raised to its utmost, when it completely closes the orifice of 13. 21 is a plug of wood, metal, rubber, or other suitable material rigidly fixed to the rod 22, which passes through its center. It is in the shape of a double cone. As shown the orifice of 14 is completely closed. 22 is a rod of metal fixed to 21, and capable of being raised or lowered by the handle or cross piece 23. It is supported by 18 in the same manner as 16. 23 is a cross piece or handle attached to 22, for raising or lowering same. 24 shows the position of the plug when raised to its utmost, when the orifice of 14 will be completely open. 25 shows the position of the handle when raised to its utmost. 18 is a horizontal support with suitable circular openings in it wherein the rods 16 and 22 may slide. It will be seen that by both the devices shown the total area of communication through the orifice of 13 or 14 can be adjusted to any required degree from the maximum to *nil*, by varying the position of the handle or cross piece. If desired such devices can be affixed to all the component compartments of a barrier such as shown in Fig. 1, and with other types of barriers similar regulating devices can be applied, the shape of the pieces 15 and 21 being modified to suit the shape of the opening with which they are to be used.

*Description of mode of operation.*—Any number of separating vessels may be used in conjunction with each other, but for the present purposes of explanation, we have in Fig. 1 only shown three vessels. This combination of machines is operated as follows:—The pulp to be operated upon, which is of a uniform consistency (that is, containing a constant proportion of solid particles to liquid) is delivered continuously at a uniform rate of speed through the pipe Q, whence it flows through the tee-shaped distributer on the disk $c$. On striking the latter the stream is diverted from a vertical to a horizontal direction and flows into the annular space formed between the shaft $i$ and the circular baffle plate $b$. Descending through $b$, the pulp then enters the main vessel or tank $a$, where the solid particles, being no longer carried along in a swift current, commence to settle downward, while the solution rises upward and travels toward the top and edge of the tank, finally overflowing from the latter into the annular channel $q$, whence it is conducted by the pipe $u$ to any suitable reservoir, to be used as desired. The solid particles continue to sink through the upper part of $a$, then encountering the barrier $d$, fall through the compartments $e$, $e$, $e$, and issuing therefrom at the orifices S S, continue to sink through the lower portion of the tank, until they are finally deposited upon the bottom of $a$, or upon other particles already deposited. In first starting the apparatus, a considerable depth of such particles is allowed to accumulate, after which the collector $j$ is started. The collector revolves at a very slow rate of speed, in order to avoid stirring up solids that have already settled; a convenient speed we have found to be one-fifth of a revolution per minute, but this must be adjusted to suit varying conditions. When the collector is revolving, the solid particles within reach of the blades $r$, $r$, are pushed or scraped by the latter toward the center of the tank, and finally arriving at this point, issue from the central orifice $w$. The solid particles removed from $w$ carry with them a considerable amount of moisture, and it is obvious that if no other procedure than that already indicated, were adopted, there would be a serious loss of values, owing to the moisture accompanying the solid particles being of the same composition and quality as the original solution introduced through Q. In order to remedy this objectionable feature, we use the solution overflowing from $a^1$ to remove the values that would otherwise be retained in the pulp and discharged at $w$.

As will be shown later, the only sources of liquid supply to vessels $a^1$ and $a^2$ are ultimately derived from, firstly, the pulp transferred from $a$ to $a^1$, and, secondly, the water, or other liquid admitted into $a^2$ through the pipe $f^2$, fed from the pipe $p$. Since, as will be shown, the supply through the pipe $p$ is constant, and as the supply of pulp from $a$ is also constant, it follows that the quantity of solution overflowing from both $a^1$ and $a^2$ is also constant. This constant overflow from $a^1$, either after or without being precipitated, is pumped into the box $k$. From $k$ there are two outlet pipes $l$ and $f$, of which $l$ feeds the box $m$, and through it the chamber $y$, while $f$ passes into the interior of $a$ and ultimately discharges at some point or points below the barrier $d$, formed by the compartments $e, e, e$. Through $l$ there is admitted a certain quantity of solution from the pump, which quantity is adjusted by means of the valve shown. This constant quantity should be sufficient in volume to dilute the thick pulp issuing below from $w$ to such an extent as to restore its consistency to about the same as that of the pulp originally delivered through the pipe Q. If desired, however, the consistency may be greater or less than that of the original pulp, the great desideratum being to obtain a uniform consistency. From the box F, the now diluted pulp (delivered to the former through the pipe $z$) is continually raised by the pump A to the box C, thence through D to $b^1$.

In case the pump should be speeded to throw more pulp than the constant supply issuing from $z$, the pipe E may be used to return any surplus to the box F, the amount so returned being regulated by the valve shown in the pipe E. This device is merely to secure a uniform delivery, since, as the supply from $z$ is constant, the total amount delivered by the pump during a given period must always be the same. The outlet $f$ from the box $k$ (which is always situated higher than the outlet at $l$) carries into the interior of the tank $a$ all of the solution delivered to the box $k$, in excess of the constant quantity removed by the pipe $l$. It will thus be seen that if the overflow from $a^1$ is decreased or increased, the quantity of solution issuing from $f$ will decrease or increase in precisely the same proportion, while the pipe $l$ must always receive its full amount of solution before the pipe $f$ can receive any. In precisely the same manner, the box $k^1$, returns the whole overflow from $a^2$ to the pipes $f^1$ and $l^1$, of which the former discharges into the interior of $a^1$, while the latter delivers a constant quantity of solution, which, passing through $m^1$ and $n^1$, ultimately mixes with the thick pulp discharged from $w^1$ into $y^1$. In the same manner box $k^2$ discharges into $f^2$ and $l^2$, but draws its own supply from the pipe $p$, which is connected with a supply of water or weak solution maintained at a constant pressure. As before, the amount of water or solution passing through $l^2$ is a constant quantity, but the amount passing to $f^2$ is regulated by the quantity of solution admitted through the pipe $p$, which again is adjusted by the valve on $p$. The water or solution delivered into $y^2$ through $n^2$ mixes with the thick pulp delivered by $w^2$, and passes out with it through the pipe $z^2$ to the conduit R, and thence to waste.

Now, apart from the solution overflowing at $q$ from $a$, it is plain that the only solution sent away from the whole series of separating vessels is that which is discharged in the form of moisture with the solids issuing from $a^2$ at $w^2$ (the water or solution introduced into $y^2$ through $n^2$ is not considered). If then the supply of water or solution furnished to the pipe $f^2$ from $p$ be equal to the amount of solution discharged with the solids at $w^2$, it follows that the total volume of the solutions contained in the three separating vessels will be maintained constant in amount. It consequently also follows that the amount of solution overflowing from $a$ at $q$ will be equal to the amount of solution introduced through Q with the original pulp. The amount of solid particles leaving $w^2$ is, of course, exactly the same as the amount introduced in the original pulp at Q, the collectors being operated at the same speed, and under the same conditions. It is obvious that in such a combination of separating vessels operating in the manner described, when solution, as for instance, a cyanid solution is introduced continually to the first vessel of the series, and water or weak solution to the last vessel of the series, the solution and the water (or weak solution) will mingle in varying proportions in the three vessels, the resulting compound being strongest in $a$, weakest in $a^2$, and intermediary in $a^1$. It is also plain that if the solution introduced into $a$ with the original pulp be of uniform strength, the solutions in the three vessels will reach a point of equilibrium as regards strength, which will be maintained as long as the operating conditions are the same. From this it will be seen that the solution entering $a$ through $f$ will be of some lesser strength than the original, but of greater strength than that which goes out at $w^2$. Now when this weaker solution is admitted into $a$ as through $f$, its tendency is to rise rapidly through the stronger and therefore heavier solution into which it has been introduced, before it coalesces and becomes homogeneous with the latter. If there is no obstacle to its upward progress, it will rise so rapidly that it will unduly dilute the solution overflowing at $q$, and it is in order to prevent this that we have introduced the barrier formed by the compartments $e, e, e$. It will be seen from the construction of this barrier that while it offers little or no obstruction to the descent of the solid particles, it greatly impedes the free mixing of solution in the portion of the tank below it, with that which is in the portion above it, as the only path by which the former can obtain access to the latter is through the small openings $S, S, S$ in the compartments $e, e, e$, the aggregate area of which is but a small percentage of the total area of the tank. If the weaker solution admitted through $f$ tends to rise rapidly upward, its further progress is stopped by impact against the under sides of $e, e, e$, and it then rapidly coalesces and becomes homogeneous with the surrounding liquid. In order to promote this mixing action, a stirrer P (shown dotted in the figure) can be employed, but we ordinarily prefer to work without this adjunct. Now, since the solution from $f$ is thus forced to mix and become homogeneous with the solution below the barrier $d$, it follows that the solution in the upper portion of $a$ is not exposed to the same chance of dilution as if it were brought directly into contact with the weaker solution from $f$. It is also plain that as the channels of communication between the upper and the lower portions of the tank are so restricted in area, the mixing of the two solutions by diffusion is much retarded. Owing to this retardation, the solution brought in with the original pulp is enabled to escape by overflowing at $q$, before it has suffered the dilution that would have taken place had the solution from $f$ been allowed to ascend freely in the tank and mix unimpeded with the solution in the upper portion of the tank. That is to say, by means of the solution introduced into $a$ through $f$ which is equal in amount to the moisture contained in the pulp withdrawn at $w$, the volume or amount of the overflow is kept equal to the volume or amount of the solution delivered with the original pulp through Q, and the strength of this overflowing solution is maintained at a high percentage of its original strength because, firstly, the solution brought in through $f$ is of appreciable strength and secondly, because by means of the barrier formed by the compartments $e, e, e$, it is prevented from unduly diluting the solution in the upper part of the tank. It may here be stated that the strength of the solution delivered from $k$ through $f$ varies (all other conditions being equal) with the number of separating vessels employed, that is, the greater the number of vessels employed, the stronger will the solution from $f$ be. To make ourselves perfectly clear, we will say that the strength of the solution overflowing at $q$ is greater than the mean strength of a solution obtained by thoroughly mixing the original solution and the displacer solution from $f$, in the same proportions as those in which they are introduced to $a$. It follows as a corollary that the solution discharged as moisture in the thick pulp leaving at $w$, is weaker than the mean strength of the hypothetical solution referred to. In other words, we discharge the solid particles from $w$ containing an impoverished solution, due to the replacement of original solution by a weaker solution. The cycle of operations is precisely the same in vessels $a^1$ and $a^2$, in the last of which water drawn from the pipe $p$, and admitted into the tank through the pipe $f^2$, acts as the replacer, rendering the outgoing solution discharged as moisture with the solids at $w^2$ very weak indeed. Instead of water any suitable salt solution may be employed.

The method of discharge from the chambers $y, y^1$, and $y^2$ requires special mention. As mentioned previously, the box $m$ is connected to $y$ by two ordinary pieces of pipe and an interposed flexible pipe $o$, which permits of the box being raised or lowered. In practice, the level of the solution in the box should be about the same as the level of the top of the tank, so that on entering $y$, the solution from $n$ may entirely fill what space is not occupied by thick pulp discharged from $w$, and thus facilitate the flow of the latter from $w$ by thoroughly soaking it, thus rendering it more mobile than if it had to push its way out into the air. Probably the pressure at $w$, due to the column of pulp in the tank, will be greater than that exercised by a column of water of the same height in the pipe $n$, and it is for this reason that the level of $m$ is made adjustable, so that, if necessary, the height may be increased till the respective pressures due to the pulp and to the solution are approximately equal. Care must be taken that the pressure due to the column of solution in $n$ is not increased to such an extent as to cause the solution to force its way up through the thick pulp into $a$. The valve on the pipe $z$ should be so adjusted that it will just discharge the constant quantity of solution delivered through $n$ to $y$ plus the constant quantity of thick pulp delivered to $y$ through $w$. The same remarks apply also to the discharges of $a^1$ and $a^2$. If it is desired to economize in the use of water, the pipe $n^2$ may be omitted, and also the chamber $y^2$, and a short tube of the same size as the aperture $w^2$, may be screwed into the latter. Into this short tube may be inserted a screw conveyer of approximately the same diameter as the interior of the tube. When this screw conveyer is rotated at a suitable speed, the thick pulp, conveyed to $w^2$ by the collector, will be carried out of the tube and discharged in the form of a heavy mud into cars or other suitable means for removing same.

Referring to the working of the whole process, it should be noted that once the various permanent adjustments have been made, the only regulation necessary is that of the valve on the pipe $p$, for controlling the supply of water or weak solution admitted into $a^2$. If the amount of solution overflowing at $q$ is greater than the amount of original solution brought into $a$ with the original pulp, then the valve must be correspondingly closed, while if, on the other hand, the overflow at $q$ is too little, the valve must be opened until the required rate of overflow is obtained. It will thus be seen that practically no attention is required, and that the process of separation is thus virtually automatic.

It will be obvious that where it is desired to deprive a pulp of water and substitute therefor a solution, this may be accomplished by admitting the original pulp to $a$ (in the manner described for the separation of solution) and using as the replacing liquid for $a^2$, the solution with which it is desired to mix the solid particles of the original pulp. In this case water or extremely weak solution will overflow at $q$ of the vessel $a$, while the thick pulp withdrawn at $w^2$ will contain solution only a little weaker than that admitted to $f^2$ as the replacing liquid.

If desired, the pipe $z$ carrying out the pulp from $y$, may be connected direct to the intake of the pump, instead of going first to the intermediate box F, as shown. Another method of discharging the thick pulp is to let it pass from $w$ into a horizontal screw conveyer, delivering into a vertical or inclined screw conveyer, by which it may be raised to the box C. In this case, the solution by the pipe $l$ from box $k$, will discharge directly into box C, and mix with the thick pulp for the first time at that point. Box $k$ will, in this case, be placed at a somewhat higher level. Either simple screw conveyers or double screw conveyers with flights intermeshing, may be used for the horizontal or vertical conveyer.

The barrier may be formed in a great variety of ways, some of which are shown in Figs. 5, 6, 7, 8, 9, and 10. The main object of all of these designs is to impede the mixture of the replacing solution with the solution in the portion of the tank above the barrier. Except in the case of Fig. 10 all the designs shown consist of barriers made up of a number of differently shaped compartments, but having the feature in common that the aggregate area of the openings into these compartments is practically the same as the area of the whole tank, while the openings out of the same compartments are relatively very small. Fig. 10 shows a different type of barrier, made up of a number of parallel, inclined partitions, the openings between which are the same both at the top and at the bottom, thus depending merely on deflection of current for its impeding effect.

As shown in Fig. 7 and Fig. 8, the barrier can be constructed with compartments which are circular in plan, and many designs can be formed in this way as for example, by the use of a number of truncated cones, the bases of which are set either at the top or the bottom level of the barrier, when, if the slopes of all the cones are similar, there will be obtained in the first case, a series of chambers which in cross section will resemble that shown in Fig. 10, but all sloping toward the center of the tank, while if the base $s$ be set at the bottom level of the barrier, the cross section will show all the partitions sloping away from the center. Similarly, barriers may be formed of which the component compartments will be triangles or polygons in plan.

If desired two or more barriers may be used in the same vessel, as shown in Fig. 6, where the second barrier is shown dotted. Where more than one barrier is used, different designs may be used for each barrier so used. Another form of barrier consisting in a horizontal sheet of metal forming a cross partition in the tank $a$, $a^1$, $a^2$, and provided with perforations, the total area of which is much smaller than the whole area of the partition.

Previous to introducing the original pulp into the first separating vessel $a$, it may or may not have added to it lime, milk of lime, or any other coagulating agent capable of assisting the settlement of the solid particles. In case there is available waste solution from some extraneous source, such solution may be used to advantage as the replacing liquid admitted through pipe $f^2$ to $a^2$, instead of water. In this case it will be desirable to use box $k^2$ only to supply the pipe $f^2$, the water required to supply the box $m^2$ being derived from an independent pipe connected with a water supply under constant head. It may be found of advantage to render the liquid used as the displacing agent (either at $f$, $f^1$, or $f^2$) heavier by the addition of some suitable soluble salt or salts, that will not injure the solution to be separated. Such salt or salts or solutions thereof, may be added at the boxes $k$, $k^1$, or $k^2$, or they may be introduced through a tee connection directly into the pipes $f$, $f^1$, or $f^2$, or they may be admitted by an independent pipe or pipes, or other convenient method, into the lower portions of $a$, $a^1$, or $a^2$. If it is desired to vary the quantity of thick pulp withdrawn through the orifices $w$, $w^1$, or $w^2$, such change may be effected by increasing or decreasing the speed of the collectors.

If desired, the shaft $I$ may be made in three independent sections, so that each separator may be driven independently of the others, through a separate pulley on each section. The driving worms on the shaft I may also be furnished with individual friction clutches or other suitable device, whereby any particular worm may be stopped or started independent of the others. In order to adjust the speed of the shaft I, the driving pulley J may be driven off a piece of mechanism known as a variable speed transmission.

We claim—

1. In an apparatus for continuously eliminating liquid from pulp, a series of vessels each provided with an upper pulp inlet and a barrier in each vessel having apertures through which solid particles descend, said barriers retarding the upward flow of extraneously introduced liquid and a pipe connection between an outlet in the bottom of the first vessel and the top of the next vessel.

2. In an apparatus of the character described, a series of vessels each provided with an upper pulp inlet, and means for deflecting the direction of the descending pulp, a barrier in each vessel having apertures through which solid particles descend, said barrier retarding the upward flow of extraneously introduced liquid, a pipe connection between an outlet in the bottom of the first vessel and the top of the next vessel, and a strainer for keeping back the larger agglomerations of pulp.

3. In an apparatus of the character described, a series of vessels each provided with an upper pulp inlet, means in the vessels for deflecting the direction of the descending pulp from a vertical to a horizontal direction, a barrier in each vessel having apertures through which solid particles descend, said barriers retarding the upward flow of extraneously introduced liquid, a pipe connection between an outlet in the bottom of the first vessel and the top of the next vessel, a strainer in the pipe for keeping back the larger agglomerations of pulp, and a regulating cock below the strainer.

4. In an apparatus of the character described, a series of vessels, each provided with an upper pulp inlet, a barrier in each vessel having apertures through which solid particles descend, said barrier retarding the upward flow of extraneously introduced liquid, a pipe connection between an outlet in the bottom of the first vessel and the top of the next vessel, means for leading the overflow from the top of one vessel to the top of the vessel preceding it in the series, and a system of perforated pipes for conveying such overflow or portion thereof to a place below the barrier.

5. In an apparatus of the character described, a series of vessels each provided with an upper pulp inlet, a barrier in each vessel having apertures through which solid particles descend, said barrier being capable of retarding the upward flow of extraneously introduced liquid, a pipe connection between an outlet in the bottom of the first vessel and the top of the next vessel, a strainer in the pipe for keeping back the larger agglomerations of pulp, and a regulating cock below the strainer device.

6. In an apparatus of the character described, a series of vessels each provided with an upper pulp inlet, a barrier in each vessel having apertures through which solid particles descend, said barrier capable of retarding the upward flow of extraneously introduced liquid, means for deflecting the direction of the descending pulp from about a vertical to about horizontal direction, a pipe connection between an outlet in the bottom of the first vessel and the top of the next vessel, and a centrifugal pump interposed in the said pipe connection.

7. An apparatus of the character described, comprising two vessels, each provided with an upper pulp inlet, a barrier in each vessel having apertures through which solid particles descend, said barrier being capable of retarding the upward flow of extraneously introduced liquid, an outlet pipe from the bottom of the first vessel, a strainer in the outlet pipe, a pipe connection from said outlet pipe to the top of the next vessel, means for leading the overflow liquid from the top of the second vessel to the top of the first vessel, a receptacle connected with said means, an overflow pipe leading from the upper portion of the receptacle, a system of discharge pipes mounted below the barrier connected with the overflow pipe, a discharge pipe connected with the receptacle below the overflow pipe, a regulating cock in the discharge pipe, a second receptacle communicating with the discharge pipe, a pipe connecting the second receptacle with the outlet pipe, and a flexible section in the connecting pipe to permit the second receptacle to be raised or lowered to alter the hydraulic head or pressure of the discharge.

8. An apparatus of the character described comprising three vessels each provided with an upper pulp inlet, a pipe connection between an outlet in the bottom of the first vessel and the top of the second vessel, a pipe connection between an outlet in the bottom of the second vessel and the top of the third vessel, a discharge conduit in the bottom of the third vessel, an overflow connection between the top of the third vessel and the top of the second vessel, an overflow connection between the top of the second vessel and the top of the first vessel, a pipe for leading pulp from the bottom of the first vessel to the top of the second vessel, a pipe for leading pulp from the bottom of the second vessel to the top of the third vessel, and centrifugal pumps in each of said pulp pipes.

9. An apparatus of the character described comprising a vessel, an overflow gutter at the top thereof, a pipe leading from the gutter, a vertical rotatable spindle in the vessel, a pulp feed at the top, a pulp deflector disk fixed on the spindle near the top thereof, a tube surrounding the disk forming an annular space, a barrier below the deflector consisting of downwardly sloping walls forming apertures at the bottom thereof, a system of spray pipes below the barrier, and horizontal bars fixed on the spindle, and blades carried by said bars for guiding the pulp toward the center of the vessel.

10. An apparatus of the character described, comprising a vessel provided with an upper pulp inlet and bottom pulp outlet, a barrier in the vessel having apertures through which solid particles descend, said barrier retarding the upward flow of extraneously introduced liquid, plugs for partly closing said apertures, means for raising and lowering the plugs, and a collector for guiding the pulp toward the center of the vessel.

11. In an apparatus of the character described, a vessel provided with an upper pulp inlet and a lower pulp outlet, a barrier in the vessel consisting of superposed rows of triangular bars forming narrow interstices, and a collector for guiding the pulp toward the center of the vessel.

12. In an apparatus of the character described, a vessel provided with upper pulp inlet and lower pulp outlet, and a barrier in the vessel having apertures through which solid particles descend, said barriers reducing the area of contact between liquid contained in the portion of the vessel above the barrier and liquid contained in the portion of the vessel below the barrier, whereby their admixture with each other is retarded.

13. In an apparatus of the character described, a vessel provided with an upper pulp inlet and a lower pulp outlet, and a barrier in the vessel having apertures through which solid particles descend, said barrier retarding the upward flow of liquid or liquids of low specific gravity from the portion of the vessel below the barrier into liquid or liquids of higher specific gravity contained in the portion of the vessel above the barrier.

14. An apparatus of the character described, comprising a series of vessels, each provided with an upper pulp inlet and a lower pulp outlet, a strainer in the latter, a barrier in the vessel having apertures through which solid particles descend, said barrier retarding the upward flow of extraneously introduced liquid, an overflow gutter, a pipe at the top of the vessel leading from the gutter, a continuously rotated spindle, a pulp deflector thereon, and a collector fixed on the spindle for guiding the pulp toward the center of the vessel.

In testimony whereof we have signed our names to this specification in the presence of two subscribing witnesses.

WILLIAM LEONARD HOLMS.
LEONARD MELVILL GREEN.
JOHN SHIELD PATTINSON.

Witnesses to the signature of William Leonard Holms and John Shield Pattinson:

JESÚS CABRAL,
J. N. CABRAL.

Witnesses to the signature of Leonard Melvill Green:

H. D. JAMISON,
W. MORBEY.